Dec. 15, 1970 H. GORDON 3,547,718

METHOD OF MAKING FLAT FLEXIBLE ELECTRICAL CABLES

Filed May 18, 1967 3 Sheets-Sheet 1

Inventor:
Herman Gordon,
by Robert K. Churchill
Attorney

Inventor:
Herman Gordon,
by Robert K. Churchill
Attorney

Dec. 15, 1970 H. GORDON 3,547,718

METHOD OF MAKING FLAT FLEXIBLE ELECTRICAL CABLES

Filed May 18, 1967 3 Sheets-Sheet 3

Inventor:
Herman Gordon,
by Robert L. Churchill
Attorney

United States Patent Office 3,547,718
Patented Dec. 15, 1970

3,547,718
METHOD OF MAKING FLAT FLEXIBLE ELECTRICAL CABLES

Herman Gordon, Maricopa, Ariz., assignor to Rogers Corporation, Rogers, Conn., a corporation of Massachusetts Filed May 18, 1967, Ser. No. 639,472
Int. Cl. H01b 13/06
U.S. Cl. 156—55 3 Claims

ABSTRACT OF THE DISCLOSURE

In the continuous formation of a flat electrical cable having a plurality of conductors covered on one side by a self-supporting insulating film, a release agent is added to the exposed conductors on the other side at predetermined longitudinally spaced transverse areas prior to the application of a resinous solution to deposit a wet or liquid film on said other side of the strip. The release agent coated side prevents adherence of the resinous solution at said spaced transverse areas of the conductors leaving exposed contact areas. After curing the wet film to a solid flexible resinous state, the continuous cable is severed through said preselected transverse contact areas leaving terminal end portions with the conductors exposed on one side adapted for connection to terminal members or the like. By this method a multiplicity of like flat electric cables may be produced in a rapid, economical and efficient manner. In a broader aspect of the invention the present method may be employed with advantage as applied to circuitry in general without limitation to cables.

BACKGROUND OF THE INVENTION

Field of the invention

The present invention is directed to circuitry in general including thin flat multiple conductor wiring cables which find application in aerospace electronics, data processing and communications equipment.

DESCRIPTION OF THE PRIOR ART

One embodiment of the present invention is an improvement on the method of making electrical cables and the like, illustrated and described in the copending application of Edward J. Traynor and Charles R. Ruffing, Ser. No. 352,154, filed Mar. 16, 1964, and now abandoned, assigned to the assignee of this invention. Briefly, the method defined in the application for continuously producing flexible flat multiple conductor cables consists in coating a relatively wide metallic foil strip with a resinous solution, converting the deposited coating to a flexible solidified resinous film, applying an appropriate resist coating on an uncoated foil surface in a pattern for the desired relatively narrow conductor configuration, removing the unwanted foil by etching, removing the resist layer and depositing a layer of insulation over the conductor pattern.

In the production of the flat multiple conductor cable in accordance with the teachings in Ser. No. 352,154, the insulation film on at least one side of the conductors, comprises polyimide or polyamide-imide resin whereby the film removal and termination techniques described and claimed in the copending application of Lawrence R. Travis, Ser. No. 352,156, filed Mar. 16, 1964, now Pat. No. 3,278,887, may be employed. The technique employed in the latter application includes the molding of the termination end of the cable within a terminating member having window openings aligned with selected areas of the conductors, and then removing the insulation from the areas of the conductors aligned with said openings by chemical action to expose contact areas of the conductors. While this expedient is of superior advantage for the purpose in which it is employed, namely, to chemically remove the insulation from one side of the cable at contact areas, the disadvantage of such method is that the insulation used must be capable of being chemically removed without injury to the terminal member molded thereto or to the remainder of the cable.

SUMMARY OF THE INVENTION

Briefly, the present method of manufacturing a multiplicity of like cable or other circuitry sections in a continuous operation includes the application of an insulating supporting film on one side of a relatively wide strip of foil; applying a resist to the foil in a pattern to define spaced parallel conductors; etching the foil in those portions not covered by the resist and then removing the resist.

In accordance with the present invention, applicant then applies a release agent to those areas of the conductors which it is desired to have remain exposed so that upon subsequent application of a wet resin over the conductors, the release agent will prevent adherence of the wet resin to those portions of the conductors desired to be exposed whereby to provide insulaton-free contact areas at preselected points along the continuous cable.

A practical advantage of this expedient is evident in the process of manufacturing a plurality of like sections of flat cables of equal length wherein each section cut from a continuous length thereof is provided with exposed contact areas at one or both ends adapted for connection to terminal elements or the like.

Accordingly, the invention has for an object to provide a novel and improved method of making electric circuitry in a continuous length or strip wherein preselected spaced areas of the circuitry on one side are left free of insulation to provide contact areas and which includes the step of cutting the strip into equal lengths, each length provided with at least one end free of insulation on one side.

With this general object in view and such others as may hereinafter appear, the invention consists in the method of making electric circuitry as hereinafter described and particularly defined in the claims at the end of this specification.

BRIEF DESCRIPTION OF THE DRAWINGS

In the drawings illustrating the preferred embodiment of the invention.

DESCRIPTION OF THE PREFERRED EMBODIMENTS

Figures 1, 2, 3, 4, 5:
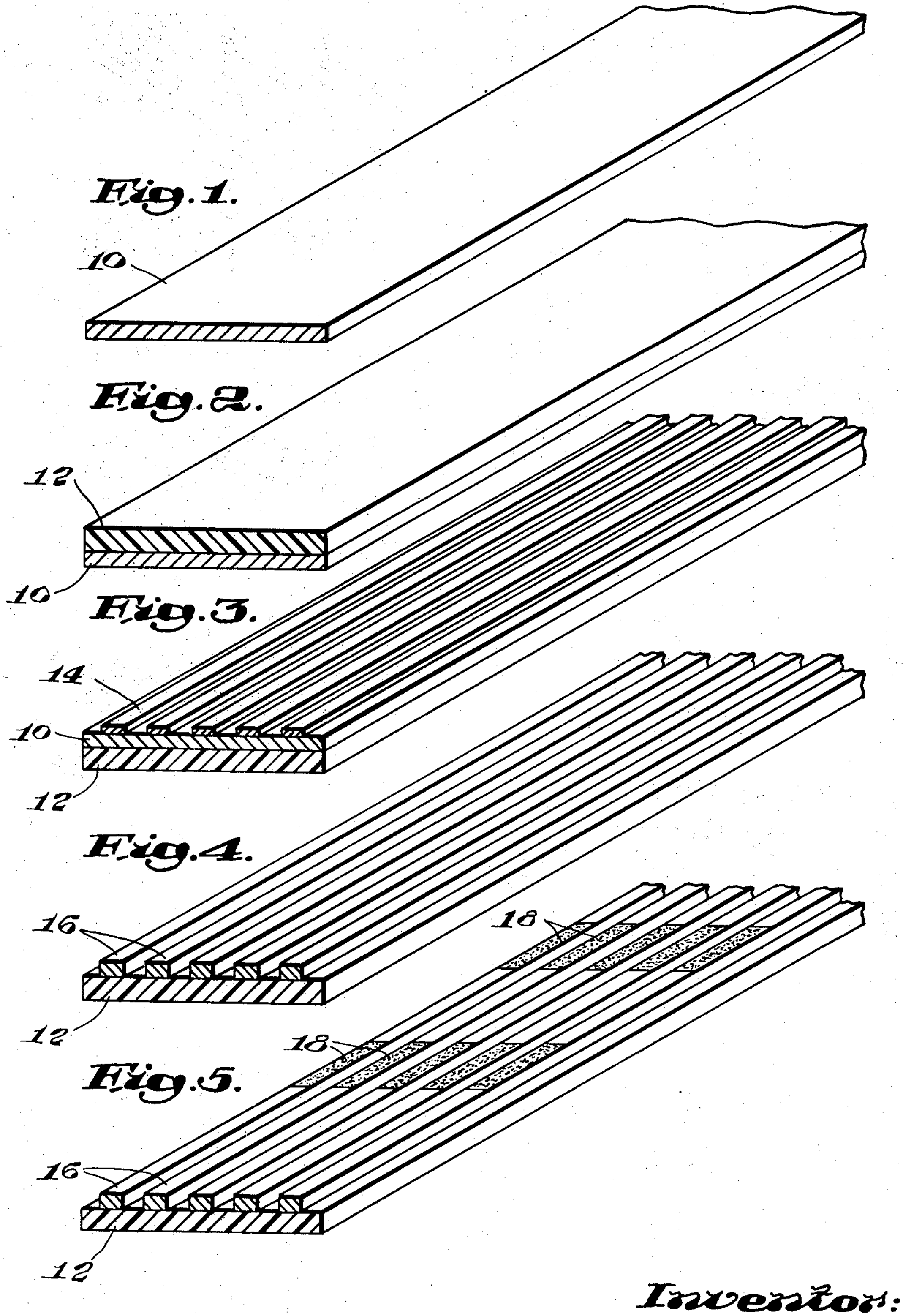
FIG. 1 is a perspective view of a continuous strip of conductive foil.
FIG. 2 is a similar view showing the conductive foil covered with a sheet of insulation on one face thereof.
FIG. 3 is a perspective view of the assembly shown in FIG. 2 inverted and provided with a resist coating applied to the exposed side of the copper foil.
FIG. 4 is a view similar to FIG. 3 after etching of those portions not covered by resist and after the resist is removed.
FIG. 5 is a perspective view similar to FIG. 4 and provided with a release agent coating at spaced intervals along the exposed face of the conductive foil.

Referring now to the drawings, the illustrated method of making a multiplicity of like flat flexible electrical cables comprises the provision of a relatively wide strip of conductive foil 10, as shown in FIG. 1, to which an insulating supporting film 12 is secured on one side thereof as shown in FIG. 2. The insulating film 12 may comprise a coating of a resinous solution to deposit a wet film on one side of the foil whereupon the wet film is heated to drive off the solvent and to cure the film to its solid resinous state, or the insulating film 12 may comprise a preformed resinous film adhesively secured to one side of the conductive foil.

After the supporting film is applied to one side of the metallic foil, an appropriate resist pattern indicated generally at 14 in FIG. 3 is silk screened, photo-printed or similarly deposited on the exposed surface of the foil. As herein shown, a plurality of continuous spaced parallel strips 14 of resist material as wide as the required conductor widths is deposited on the exposed metallic foil 10.

The resist coated metallic foil is then continuously passed through a chemical or electrolytic etch and the uncoated foil is removed or dissolved to leave only the desired metallic conductor configuration outlined by the resist pattern whereupon the resist pattern is removed leaving the exposed individual transversely spaced conductors 16 as shown.

The next step in the continuous production of a multiplicity of like flat flexible electrical cables includes the step of applying a release agent at predetermined longitudinally spaced transverse areas as indicated at 18. The exposed conductor surfaces 16 are then coated with a layer of insulation. The second or cover layer 20 of insulation may be produced by applying a resinous solution to the exposed conductors, the release agent preventing adherence of the wet resin to the release coated areas 18, whereupon the cover layer is dried and cured.

Figures 6, 7, 8:
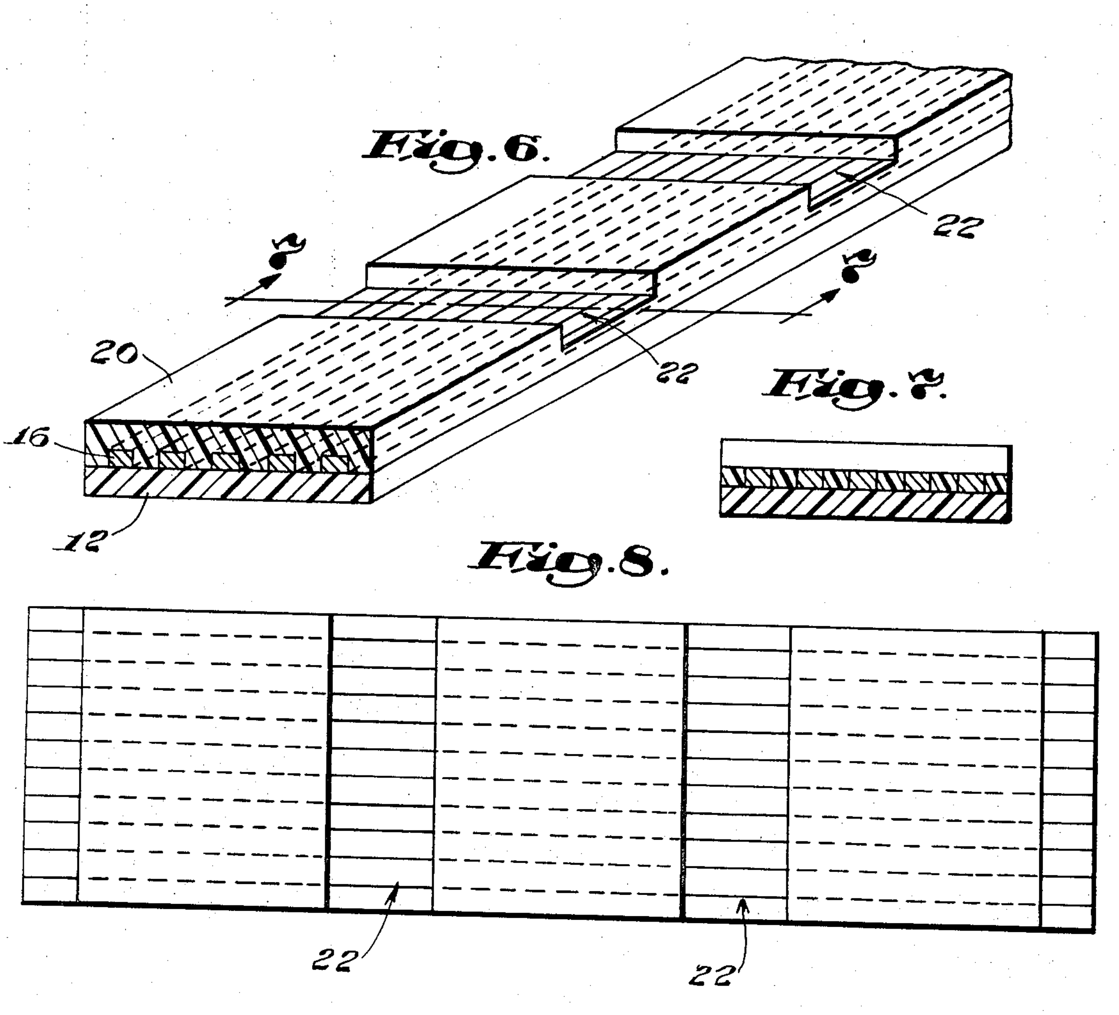
FIG. 6 is a perspective view showing the assembly provided with an insulating coating on the exposed face of the conductive foil wherein those portions provided with a release are free of insulation.
FIG. 7 is a cross sectional view taken on the line 7—7 of FIG. 6.
FIG. 8 is a plan view of the structure shown in FIG. 6.
Figure 9:
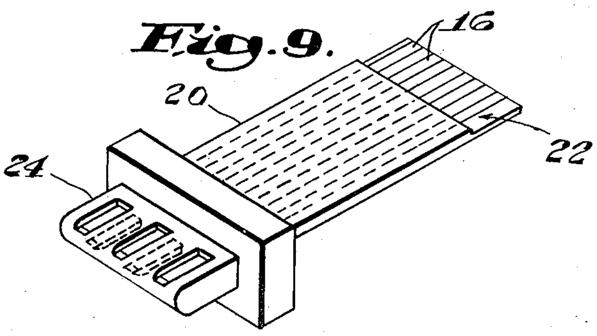
FIG. 9 is a perspective view of a cable section cut from a continuous length thereof showing one exposed conductor end provided with a terminal member, and the other end adapted for connection to suitable terminals.

From the description thus far it will be seen that the method steps defined above will produce a continuous strip of flexible electrical cable having longitudinally spaced uncovered transverse areas free of insulation as indicated at 22, leaving the conductors exposed as shown in FIGS. 6, 7, and 8. The continuous strip is then cut transversely at spaced intervals through the exposed areas 22 to provide individual lengths of flat electrical cable wherein the conductors are exposed at each end on one side of the cable. The cut lengths of cable thus produced may be used in a selected circuit or circuits. As illustrated in FIG. 9, for example, one end of the cable length may be provided with a terminal member indicated at 24 of the type illustrated and described in U.S. Pat. No. 3,287,887, assigned to the present assignee. The other end of the cable length is provided with exposed contacts adapted for connection in a circuit in any usual or preferred manner, or the second end may be provided with a female terminal. It will be understood that the strip may be severed at any point intermediate the edges of the exposed areas, or may be severed along one edge of the exposed area.

In practice, the insulation on the first side of the conductive foil or conductive cable structure may comprise a film of resinous material either deposited from a solution, dried and cured to provide a supporting film, or may comprise a resinous material bonded to the foil in the form of a preformed film. When deposited in the form of a solution, the resinous material may comprise, among others, an aromatic polyamide-imide resin.

In a modified form of the present method of making a plurality of flat cable sections, the second or cover sheet may comprise a preformed film of FEP Teflon or other thermoplastic sheet material which may be bonded to the exposed side of the conductors in any usual or preferred manner, such as by adhesive or by the application of heat and pressure, after the release agent has been applied at spaced areas as described. In operation, the release prevents sticking of the preformed film at those points where the release is applied. Thereafter, when the cable sections are cut from the continuous length, the non-adhering portions of the cover film at the terminal end or ends may be cut from the film to leave the contacts exposed on one side of the cable.

The release agent can be applied to either the top surfaces of the conductors or to a broader area, depending on what is desired. In practice, any commercially available release agent may be employed, such as TFE aerosol can mold release, or almost any commercially available wax or silicone mold releases.

In practice, the release agent may be applied to the upper surfaces of the conductors, as illustrated in FIG. 4, or the release agent may extend across the insulated areas between the conductors as well as across the conductors. In a modified form of the invention, when the second or covering sheet of insulation comprises a preformed insulating film, as shown at 26 in FIG. 10, the release agent may be applied to the film at predetermined areas, as indicated at 28, instead of to the conductors.

Figures 10, 11, 12:
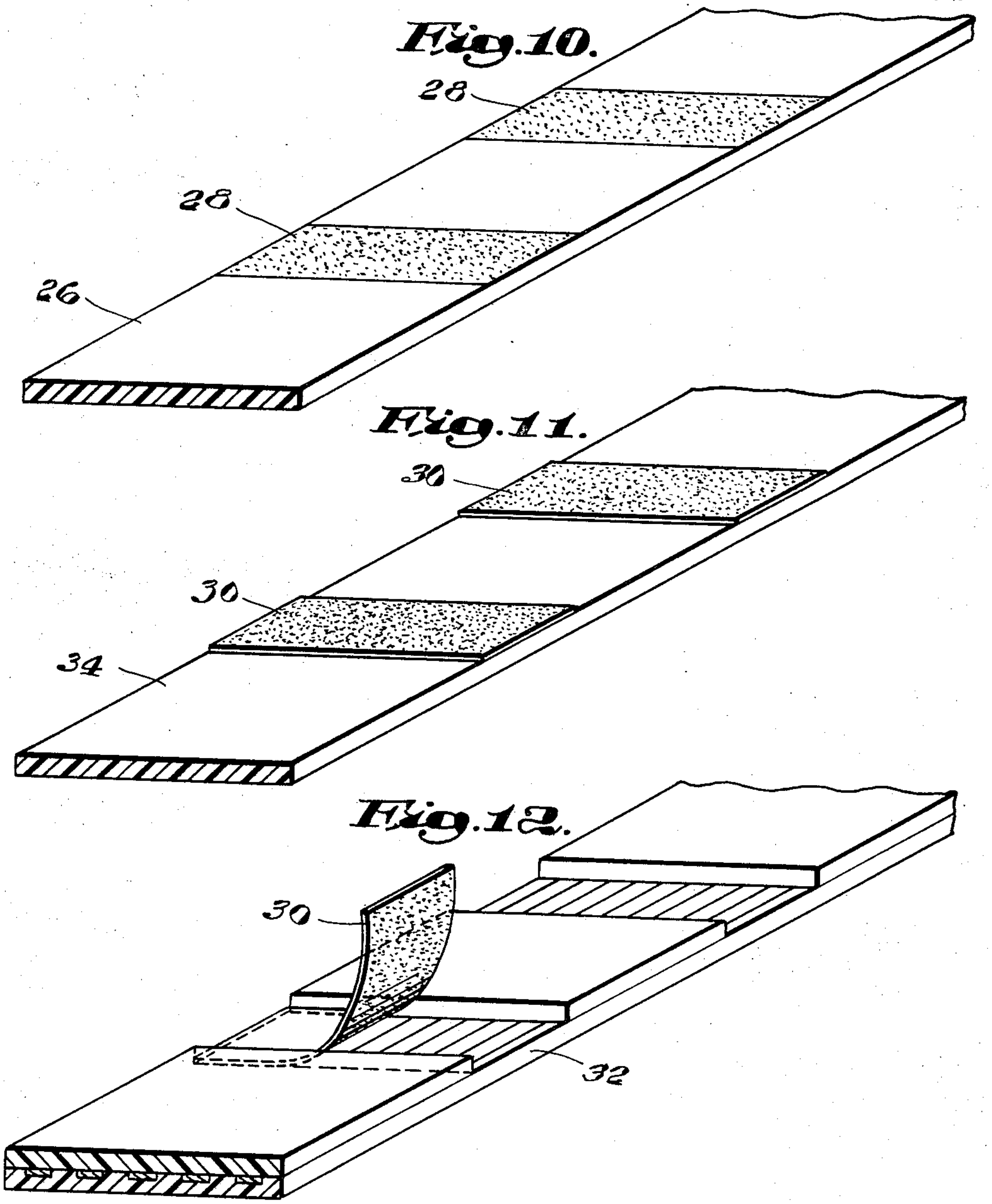
FIG. 10 is a perspective view of a preformed strip of resinous insulating material showing the strip provided with longitudinally spaced transverse areas provided with a release coating.
FIG. 11 is a view similar to FIG. 10 showing the preformed strip provided with pressure-sensitive tapes at spaced intervals.
FIG. 12 is a perspective view of an assembly to which a covering sheet of insulation has been applied over the pressure-sensitive tapes and showing the tape being removed.

In another modified form of the invention, instead of using a release agent on the conductors or on the insulating film to prevent adherence of the film to the conductors at preselected areas, the exposed conductors may be covered at such preselected areas with a masking tape 30, such as a pressure-sensitive transparent tape or an aluminum foil pressure-sensitive tape. In such event, after the second or cover film is applied, the pressure-sensitive tape may be removed taking the adjacent or overlying insulation with it to expose the conductors at the preselected areas as illustrated in FIGS. 11 and 12. It will be understood that the masking tape may be applied either to the laminated strip 32 or to the inner face of a preformed covering material 34.

In still another modified form of the invention, when the second or covering sheet of insulation comprises a preformed sheet of F.E.P. Teflon which has been subjected to a Type C treatment, the method employed for preventing adherence of the preformed strip to selected longitudinally spaced transverse areas comprises subjecting or exposing such preselected transverse areas to a strong light to effect destruction of the Type C treatment at such areas prior to application of the preformed sheet to the assembly. As a result, those portions of the preformed Teflon sheet thus exposed will fail to adhere to the underlying conductors at such spaced areas during application of the sheet to the exposed conductors by heat and pressure. Upon severance of successive lengths of flat cable through the non-adhering portions of the strip to from individual flat cables, the Teflon overlying the spaced areas may be removed by severing or otherwise to expose the conductors at one or both terminal ends of the individual cables.

The above description defines the invention as practiced on a flat cable type of circuitry. However, it will be understood that the invention may be practiced with other types of circuitry. Also the flat multiconductor cable upon which the present invention is practiced and which is defined as produced by etching could comprise a cable produced by slitting the conductors from metal foil to produce individual conductors which are sandwiched as spaced parallel strips between two layers of film insulating material.

The present invention also contemplates use of prestripped cables and conventional connectors. Any usual or preferred terminal connections may be used including a so-called "paddle board" type of termination produced by rigidizing the ends of the cable by molding two laminates to make the termination.

In a further embodiment of the present invention, when the cover sheet comprises a preformed film, windows may be cut in the preformed film at preselected areas coinciding with the exposed foil prior to laminating the cover sheet to the conductors and the backing sheet. This would eliminate the need for having a mold release on the etched circuitry. Reference may be made to the U.S. Pat. No. 3,052,823, issued to Anderson et al., and assigned to the present assignee as an example of windowed circuitry.

From the above description it will be seen that the present invention provides a novel and improved method of manufacturing a multiplicity of like flat electrical cables in a continuous operation which includes the steps of applying a mold release on the exposed conductors at predetermined spaced intervals in the continuous length of the cables prior to applying an insulation cover over the conductors whereby to prevent adherence of the insulation to the conductors at such spaced intervals. It will be apparent that this expedient provides a more convenient and economical method of making successive like sections of cable, which may be cut from the continuous strip, as compared with those methods which require the insulation to be removed mechanically, as by abrading, or chemically, as by etching, which might damage the conductors.

While the preferred embodiments of the invention have been herein illustrated and described, it will be understood that the invention may be embodied in other forms within the scope of the following claims.

Having thus described the invention, what is claimed is:

1. A method of producing flexible electrical cables of predetermined length from an elongated flexible insulating film having a plurality of spaced, flat exposed conductors bonded to one side thereof to form a laminatte, said method comprising the steps of:

applying a release agent to said laminated conductors and film at predetermined longitudinally spaced transverse areas, said release agent coating at least portions of the exposed sides of said conductors and preventing adherence of resinous insulating material thereto;

depositing a resinous solution as a wet film over said exposed conductors and the surface of said insulating film to which said conductors are bonded;

converting the wet film into a discontinuous cover film comprising a solid flexible resin, the areas of said laminated conductors and the surface of said insulating film which have been coated with said release agent remaining free of said converted film; and transversely cutting the laminated structure through the discontinuities in the cover film to provide a plurality of individual flexible electrical cables having exposed conductors on at least one end of each cable length.

2. The method defined in claim 1 wherein the resinous solution comprises an atomatic polyamide-imide resin.

3. A method of continuously producing a plurality of flat flexible electrically conductive cables from a flexible strip of metallic foil laminated to a resinous backing film which includes the steps of depositing a resist coating over the exposed surface of said foil in a pattern having a plurality of spaced paths, moving the laminate through a chemical etching solution to dissolve the uncoated portions of the metallic foil to provide a plurality of conductors, removing the resist coating to expose the surface of the conductors, applying a liquid release coating to the laminate at preselected longitudinally spaced transverse areas to prevent adherence of resinous insulating material to the release agent coated areas, depositing a resinous solution as a wet film on the side of the laminate to which the conductors are bonded, converting the wet film to a discontinuous solid flexible resinous insulating film bonded to the conductors and the backing film to form a laminated structure having exposed contact areas at said release agent treated areas, and then cutting the structure through said areas to provide a plurality of flat electrically conductive cables.

References Cited

UNITED STATES PATENTS

| | | | |
|---|---|---|---|
| 3,086,888 | 4/1963 | Stratton et al. | |
| 3,173,991 | 3/1965 | Breakfield | 174—117 |
| 3,226,473 | 12/1965 | Dahlgren | 174—117 |
| 3,239,916 | 3/1966 | Love | 174—117X |
| 3,264,403 | 8/1966 | Erdle | 174—117X |
| 3,345,455 | 10/1967 | Goody | 174—112 |
| 3,391,246 | 7/1968 | Freeman et al. | 174—117 |

VERLIN R. PENDEGRASS, Primary Examiner

U.S. Cl. X.R.

174—117